United States Patent
Greenhill

(10) Patent No.: US 7,169,247 B2
(45) Date of Patent: Jan. 30, 2007

(54) METHODS AND APPARATUS FOR LAMINATING DOCUMENTS

(76) Inventor: Kenneth Ian Greenhill, P.O. Box 3104, Milford, CT (US) 06460

( * ) Notice: Subject to any disclaimer, the term of this patent is extended or adjusted under 35 U.S.C. 154(b) by 235 days.

(21) Appl. No.: 10/457,310

(22) Filed: Jun. 9, 2003

(65) Prior Publication Data

US 2004/0213938 A1    Oct. 28, 2004

Related U.S. Application Data

(60) Provisional application No. 60/465,405, filed on Apr. 24, 2003.

(51) Int. Cl.
*B32B 37/00* (2006.01)

(52) U.S. Cl. .................. 156/227; 156/226; 156/201; 156/204; 156/270; 493/356; 428/41.8; 428/192; 428/121; 206/484

(58) Field of Classification Search ............. 156/200, 156/201, 204, 211, 226, 227, 248, 249, 252, 156/253, 257, 271, 259, 268, 270; 493/188, 493/223, 231, 239, 243, 267, 346, 347, 356; 206/484, 484.2, 441; 128/846; 602/52, 602/54, 57; 428/192, 121, 124, 40.1, 41.7, 428/41.8

See application file for complete search history.

(56) References Cited

U.S. PATENT DOCUMENTS

| 3,897,293 | A | * | 7/1975 | Babcock | 156/227 |
| 4,598,004 | A | * | 7/1986 | Heinecke | 428/41.5 |
| 4,614,183 | A | * | 9/1986 | McCracken et al. | 128/846 |
| 4,841,712 | A | * | 6/1989 | Roou | 53/412 |
| RE33,353 | E | * | 9/1990 | Heinecke | 428/41.5 |
| 4,986,868 | A | * | 1/1991 | Schmidt | 156/249 |
| 5,328,538 | A | * | 7/1994 | Garrison | 156/249 |
| 6,852,409 | B2 | * | 2/2005 | Bradley et al. | 428/354 |

* cited by examiner

*Primary Examiner*—Linda Gray
(74) *Attorney, Agent, or Firm*—Greer, Burns & Crain, Ltd.

(57) ABSTRACT

A substrate of label stock or the like has pressure sensitive adhesive on one side, covered by release material. The release material is folded back or removed along one edge of the substrate, exposing the pressure sensitive adhesive along that edge. A transparent laminate is secured to the substrate by the exposed pressure sensitive adhesive. A photograph of other document can be secured inside the device by lifting the unadhered portion of the laminate, placing the photograph between the laminate and the substrate, removing the release layer to expose the remainder of the pressure sensitive adhesive layer, and pressing the photograph and laminate against the lower substrate. The photograph is preferably smaller than the laminate product, so that the laminate is secured to the substrate around all edges of the photograph.

2 Claims, 4 Drawing Sheets

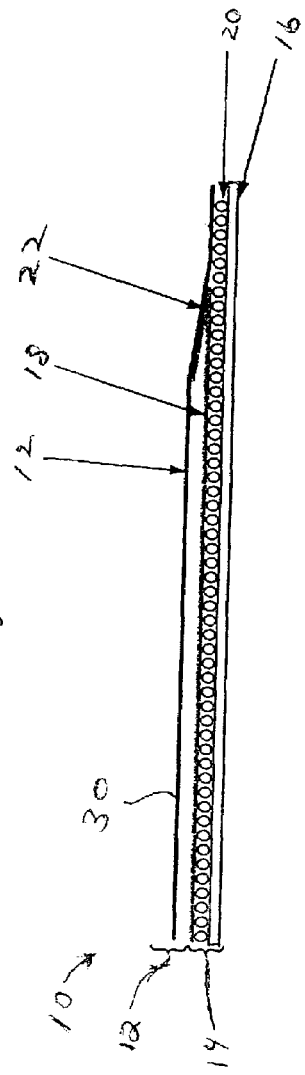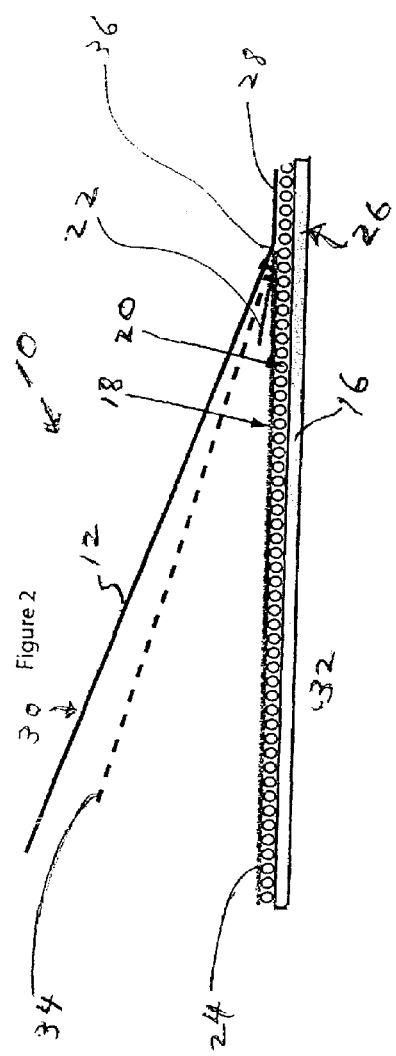

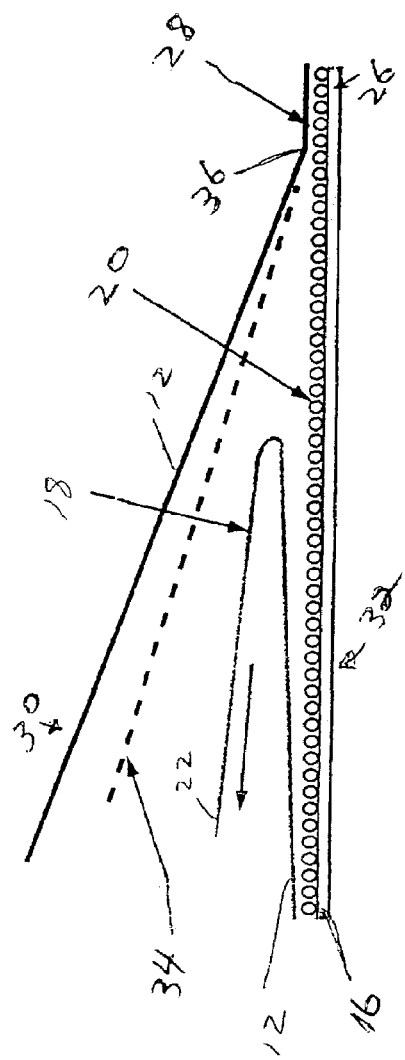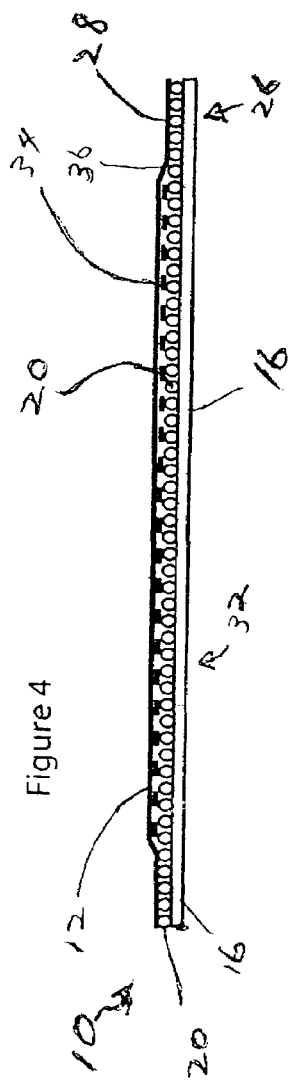

METHODS AND APPARATUS FOR LAMINATING DOCUMENTS

This is a Continuation of Provisional Application Ser. No. 60/465,405, filed on Apr. 24, 2003.

This invention relates to methods and apparatus for laminating documents, and more particularly, to methods and apparatus for laminating photographs without lamination equipment.

BACKGROUND OF THE INVENTION

Documents such as driver's licenses and security badges are routinely laminated, to protect the documents from damaging environmental conditions such as moisture. The document is placed in a lamination machine that heats the lamination material as needed, applies the lamination material to the documents and trims the material. The process is effective, but the lamination machine is expensive and inconvenient. Thus, there is a need for lamination methods and apparatus that do not require such lamination equipment.

Accordingly, one object of this invention is to provide new and improved methods and apparatus for laminating documents.

Another object is to provide new and improved methods and apparatus for laminating documents that do not require lamination equipment for applying the lamination to the document.

Still another object is to provide new and improved methods and apparatus for conveniently and inexpensively laminating documents.

SUMMARY OF THE INVENTION

In keeping with one aspect of the invention, a substrate of label stock or the like has pressure sensitive material on one side, covered by release material. A portion of the release material is folded back along one edge of the substrate, exposing the pressure sensitive adhesive along that edge and thus creating a pull tab. A transparent laminate is secured to the substrate along that edge by the exposed pressure sensitive adhesive. The transparent film and/or pressure sensitive material can be printed, if desired, particularly around the outside edges.

A photograph or other document can be secured inside the device by lifting the unadhered portion of the laminate that covers the release material, placing the photograph between the film lamination and the pressure sensitive substrate above the tab, removing the release layer by pulling the tab outward to expose the remainder of the pressure sensitive adhesive layer, and pressing the photograph and laminate against the lower substrate. The photograph can be smaller than the laminate product, so that the lamination is secured to the base substrate around all of its outer edges.

The lamination product is made by moving a web of pressure sensitive adhesive material, having release material on one side, along a path that may include one or more printing stations, if desired. The release material is scored and/or partially slit to allow the release layer to be folded back at a conventional plough station. The folded back portion of the release liner exposes the pressure sensitive adhesive along an edge of the web.

A web of transparent laminating material, which may also be printed on either or both sides, is married to the underlying web after the release layer is exposed, and secured to the web along the exposed edge of pressure-sensitive adhesive. The web is then die cut into individual pieces having a desired size.

BRIEF DESCRIPTION OF THE DRAWINGS

The above mentioned and other features of this invention and the manner of obtaining them will become more apparent, and the invention itself will be best understood by reference to the following description of an embodiment of the invention taken in conjunction with the accompanying drawings, in which:

FIG. 1 is a cut-away side view of a lamination product made in accordance with the present invention;

FIG. 2 is a cut-away side view of the product of FIG. 1, showing a photograph inserted in the assembly, but not secured;

FIG. 3 is another cut-away side view of the product of FIG. 1, showing the release liner being removed from the product after the photo is inserted;

FIG. 4 is a cut-away side view of the product of FIG. 1, showing the lamination secured;

DETAILED DESCRIPTION

Figure 7:
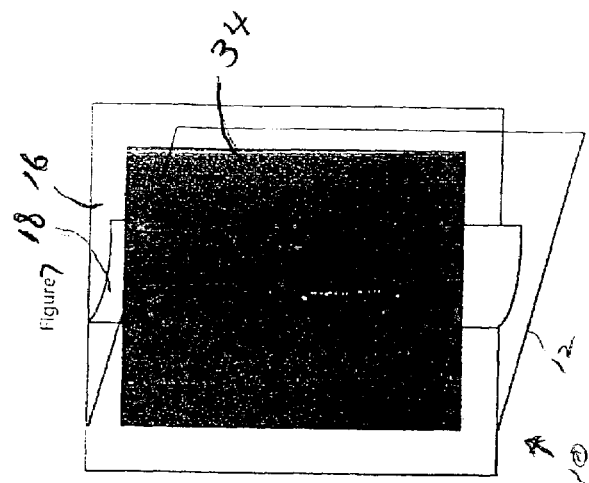
FIG. 7 is a perspective view of the lamination product of FIG. 5, showing the release liner as it is removed.

As seen in FIG. 1, a lamination product 10 includes a layer 12 of unsupported film that can be print receptive on both sides, and a layer 14 that includes a layer 16 of paper or film, releasably adhered to a layer of paper or film 18, through a pressure sensitive adhesive 20. The film can be clear or tinted film substrate, typically a laminate, and the release layer 18 is ordinary release liner used for pressure sensitive adhesive labels. Adhesive layer 20 can be any suitable pressure sensitive or other suitable adhesive, and the substrate 16 can be label stock or any other suitable material.

As seen in FIG. 2, a portion 22 of the release layer 18 is folded over a larger portion 24, which exposes a portion 26 of the adhesive on the base substrate 16, so that an edge portion 28 of the laminate 12 is directly adhered to the portion 26 of the substrate 16. In this manner, a hinge 36 is formed in the laminate 12.

A portion 30 of the laminate 12 is not adhered to a portion 32 of the substrate 16, due to the intervening release layer portion 24. In this manner, the portion 30 can be lifted from the portion 32 to insert a photograph 34 or other document into the device 10 above the tab 22 created by the folded section of the release layer 18.

Preferably, the photograph 34 is smaller in size than the portion 32, 50 that the outside edges of the adhesive in the portion 32 can contact the underside of the portion 30 when the release liner 18 is removed, although extra space is not necessary at the hinge 36.

After the photograph 34 is inserted into the device 10, as shown in FIG. 2, the release liner 18 can be easily removed, as seen in FIG. 3. The tab 22 can be used to remove the release liner, or the release liner can be removed in any other desirable manner.

The photograph 34 is shown fully laminated in the device 10 in FIG. 4. Because the adhesive 20 is pressure sensitive, the laminate 12 can be easily adhered to the substrate 16. In other words, with the release liner 18 completely removed, the laminate can be sealed around the edges of the photograph 34. In this manner, the photograph 34 itself is adhered to the base layer 12 by the adhesive 20, and the photograph 34 is covered by the laminate 12.

Figure 5:
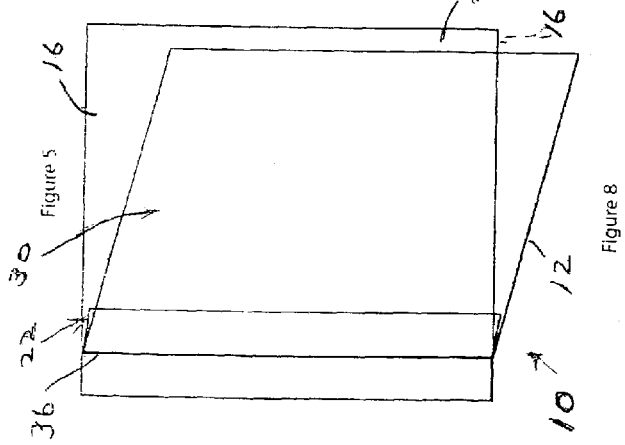
FIG. 5 is perspective view of the lamination device of FIG. 1, as manufactured.

The device 10 is also shown in FIGS. 5 through 8. The product 10 as obtained by a consumer is shown in FIG. 5, where it is apparent that the portion 30 of the laminate 12 can be lifted from the substrate 16 due to the intervening release liner 18. The hinge 36 can also be seen in FIG. 5, as can the manner in which the portion 28 is adhered along an edge of the substrate 16.

Figure 6:
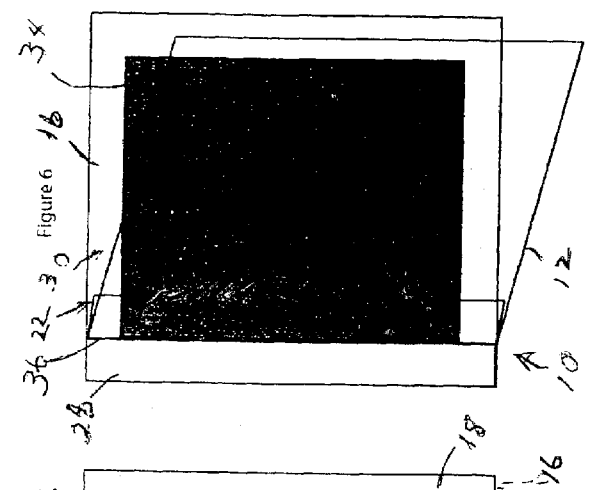
FIG. 6 is a perspective view of FIG. 5 showing a photograph inserted in the product.

FIG. 6 illustrates insertion of the photograph 34 into the device 10. In this figure, it is apparent that the photograph 34 is inserted beneath the laminate 12, over the entire release liner 16, including the tab portion 22. While FIG. 6 shows the photograph 34 abutting the hinge 36, the photograph 34 could be spaced from the hinge 36, if desired. In any event, the release layer 18 is removed in the manner shown in FIG. 7. It is most easily removed by pulling the tab portion 22, but it could also removed from any other portion of the release liner.

Figure 8:
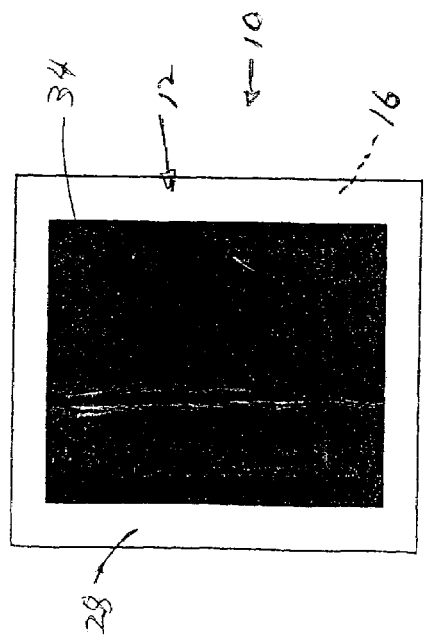
FIG. 8 is a perspective view of the product of FIG. 5, with the photograph secured inside the product.

When the release liner 18 is removed, the laminate 12 can be easily adhered to the base layer 16, as seen in FIG. 8. The photograph 34 is also adhered to the base layer 16. It is apparent from FIG. 8 that the photograph 34 is smaller than the base layer 16, though, so that the laminate 12 is adhered around all of the outside edges of the photograph 34.

Figure 9:
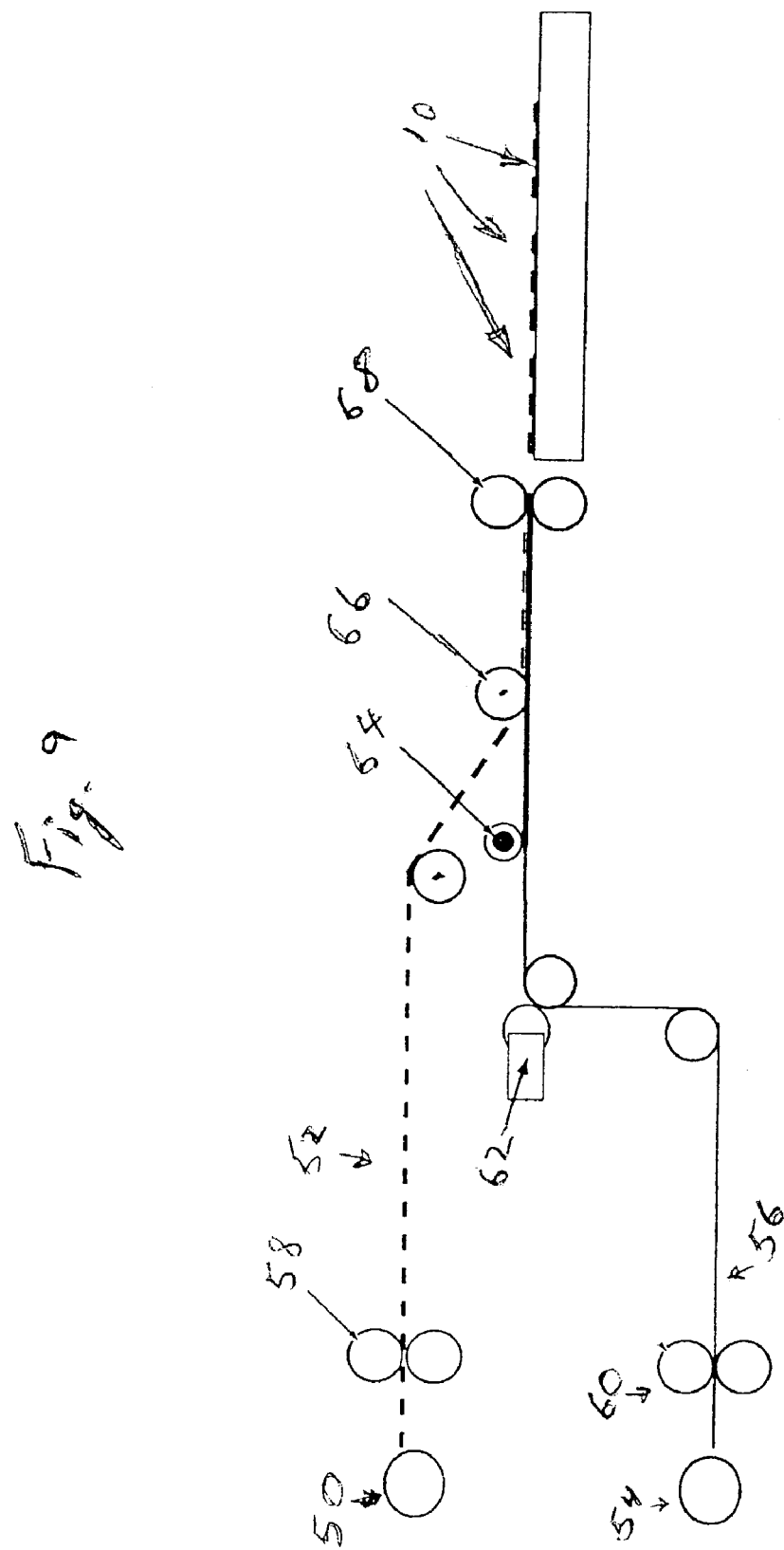
FIG. 9 is a diagram illustrating the manufacturing process used to make the product of FIG. 1.

The process for manufacturing the lamination products 10 is illustrated in FIG. 9. A reel 50 of clear synthetic material such as polypropylene, vinyl or any other suitable material, is unrolled along a path 52, and a reel 54 of pressure sensitive material is unwound along a path 56. The pressure sensitive material 54 has one surface coated with a removable layer of release liner that when removed, exposes a layer of pressure sensitive adhesive.

The laminate 50 may be printed on one or both sides at one or more print stations 58, and the pressure sensitive material can also be printed, on one or both sides, at print stations 60.

The substrate 54 is scored and/or partially slit at a station 62, to allow the release liner to be folded back at a plow station 64. While the release liner is preferably folded back, as shown in FIGS. 1–8, it is contemplated that the release liner could be slit and the unwanted portion of the release liner removed.

The laminate 50 is adhered to the base substrate 54 at a station 66, which could be nip rollers or the like. The laminate 50 is adhered to the substrate 54 along the exposed edge of the substrate 54, and the remaining portion of the laminate rests un-adhered over the release liner. The married webs are die-cut at a station 68, producing the lamination products 10.

While the principles of the invention have been described above in connection with specific apparatus and applications, it is to be understood that this description is made only by way of example and not as a limitation on the scope of the invention.

What is claimed is:

1. A method for manufacturing a lamination product comprising the steps of
   moving a web of material along a path, the web having pressure sensitive adhesive on one side, substantially all the pressure sensitive adhesive being covered by a single sheet of release material,
   exposing the pressure sensitive adhesive alone an edge of the web, the exposed pressure sensitive adhesive being exposed by folding the release material, the release material remaining with the web after folding,
   adhering transparent laminate to the web where the pressure sensitive adhesive is exposed, the laminate also covering substantially all of the pressure sensitive adhesive under the release material, and
   die cutting the web into Individual lamination products having a desired size.

2. The method of claim 1 comprising the step of printing the transparent laminate on at least one of its outer edges.

* * * * *

UNITED STATES PATENT AND TRADEMARK OFFICE
CERTIFICATE OF CORRECTION

PATENT NO. : 7,169,247 B2 Page 1 of 1
APPLICATION NO. : 10/457310
DATED : January 30, 2007
INVENTOR(S) : Kenneth Ian Greenhill It is certified that error appears in the above-identified patent and that said Letters Patent is hereby corrected as shown below:

Col. 2, line 62, delete "50" and insert --so--

Signed and Sealed this

Eighth Day of May, 2007

JON W. DUDAS
*Director of the United States Patent and Trademark Office*